United States Patent [19]

Van Zandt

[11] Patent Number: 4,707,087

[45] Date of Patent: Nov. 17, 1987

[54] PORTABLE ADJUSTABLE MIRROR ASSEMBLY

[76] Inventor: Willie L. Van Zandt, 1620 Ridgecrest, Odessa, Tex. 79763

[21] Appl. No.: 860,438

[22] Filed: May 7, 1986

[51] Int. Cl.⁴ .......................... G02B 7/18; G02B 5/08
[52] U.S. Cl. ..................................... 350/638; 350/621
[58] Field of Search .............. 350/638, 621, 618, 612, 350/635, 639, 640

[56] References Cited

U.S. PATENT DOCUMENTS

| | | | |
|---|---|---|---|
| 1,317,934 | 10/1919 | Mohr | 350/638 |
| 2,312,608 | 3/1943 | Wadsack | 350/638 |
| 2,352,819 | 7/1944 | Winslow | 350/638 |
| 2,379,214 | 6/1945 | Bolinger | 350/638 |
| 4,257,680 | 3/1981 | Baczkowski | 350/638 |

FOREIGN PATENT DOCUMENTS 1517263  3/1968  France ................................ 350/638

Primary Examiner—Jon W. Henry
Attorney, Agent, or Firm—Quaintance, Murphy & Presta

[57] ABSTRACT

A portable adjustable mirror assembly is disclosed which can be mounted on the upper torso of a user, thereby enabling the user to view all sides of his or her head while having both hands free to cut or style his or her own hair. The mirror assembly comprises a mirror, a box for holding grooming implements, neck strap supports carried by the box, a neck strap removably fastened to the neck strap supports, and mirror support means carried by the box for adjusting the position of the mirror relative to the user.

16 Claims, 7 Drawing Figures

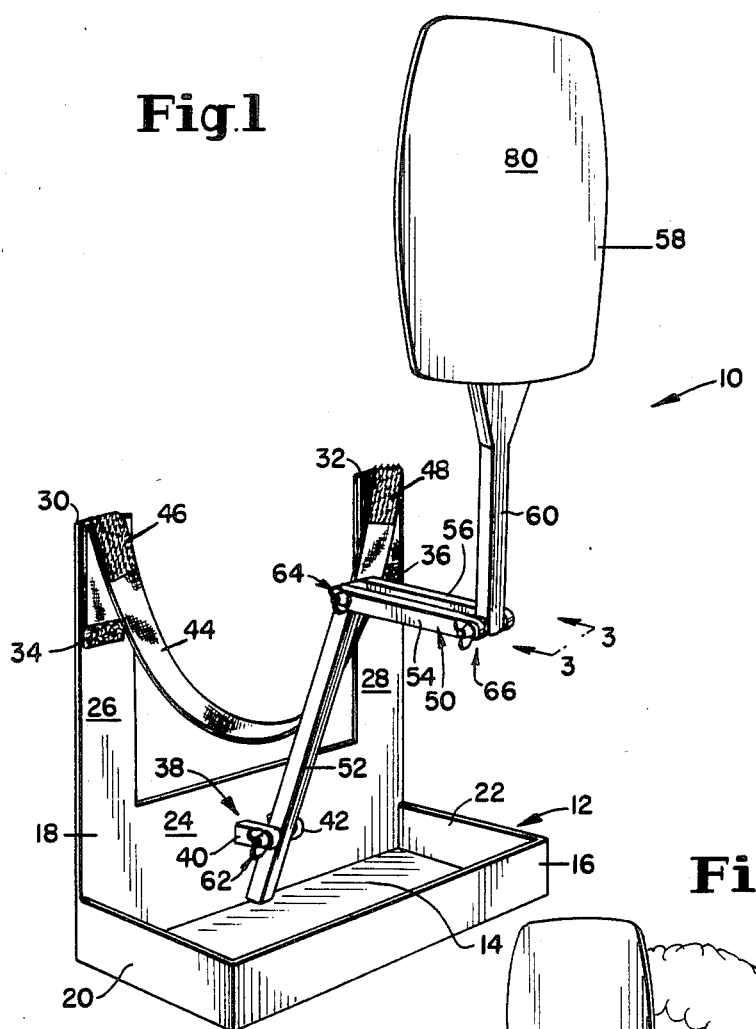
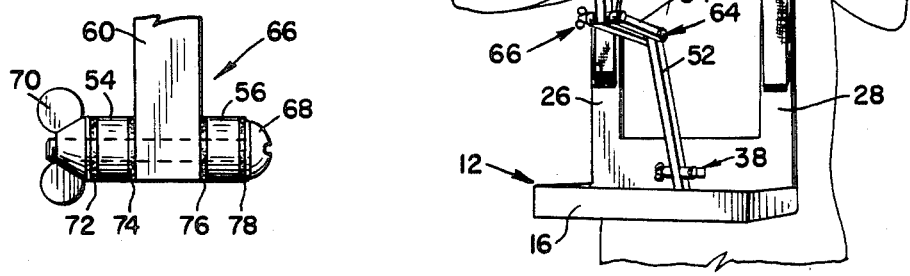

U.S. Patent  Nov. 17, 1987  Sheet 2 of 2  4,707,087
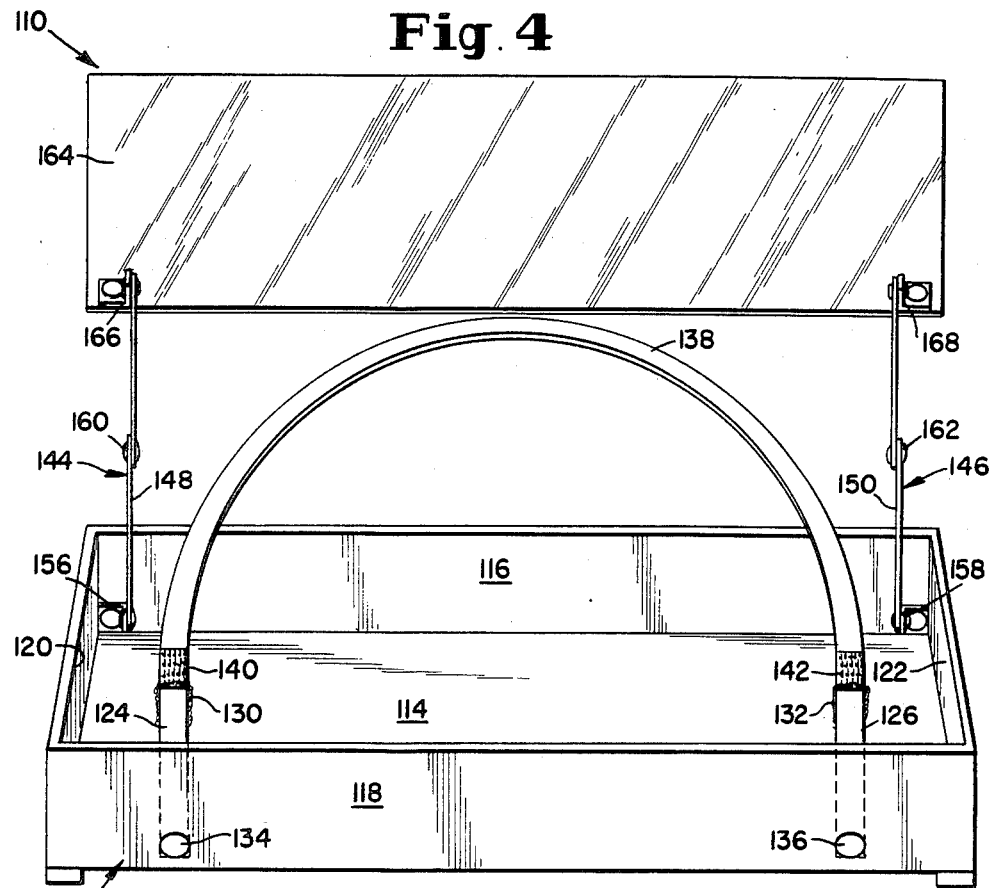
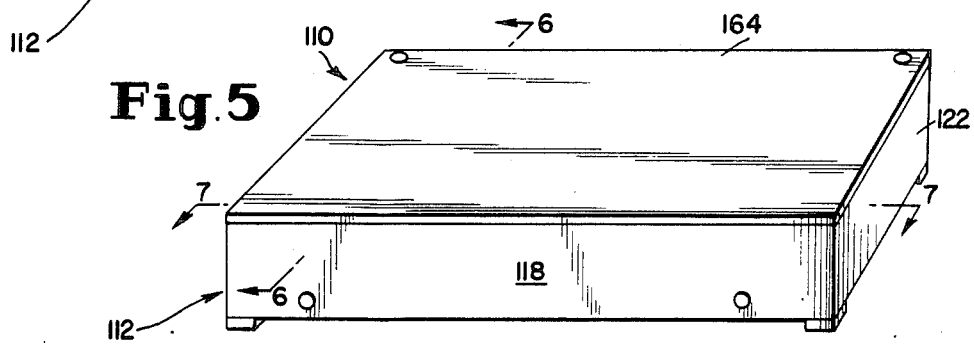
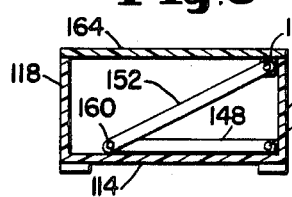
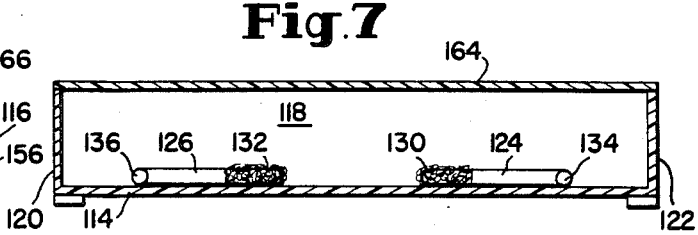

PORTABLE ADJUSTABLE MIRROR ASSEMBLY

BACKGROUND OF THE INVENTION

The present invention relates to a portable mirror assembly, and, more particularly, to an adjustable portable mirror assembly which is mounted on the upper torso of the user. When used in conjunction with an additional mirror, the new and improved construction of the present invention permits the user to view his or her head from all sides while leaving both hands free to cut or style hair. In addition, the present invention employs a tray or box which provides the user with easy access to curlers, scissors and the like.

Portable mirror assemblies are currently in use which are supported on the upper torso of the wearer. However, these conventional assemblies do not permit the wearer to longitudinally adjust the height of the mirror in order to view the back of his or her head. While these conventional assemblies have generally allowed the wearer to have both hands free while the mirror is in use, the conventional construction has made it difficult or impossible for the wearer to cut or style the back of his or her own hair. Furthermore, because none of the existing mirror assemblies includes a tray, the wearer does not have ready access to his or her implements while the mirror assembly is in use.

SUMMARY OF THE INVENTION

The portable adjustable mirror assembly of the present invention permits the user to view all sides of his or her head while having both hands free to cut or style his own hair. The mirror assembly comprises a box or tray, a pair of neck strap supports carried by the box, a removable neck strap adapted to be fastened to the neck strap supports, mirror support means carried by the box, and a mirror carried by the mirror support means.

In one embodiment of the present invention the mirror support means comprises a first arm and a pair of second arms. One end of the first arm is movably connected to the rear wall of the box. The other end of the first arm is movably secured between first ends of the pair of second arms. In this embodiment, the mirror has an elongated handle which is movably secured between second ends of the pair of second arms. The movable connections between the box and the first arm, the first arm and the second arms and the second arms and the handle of the mirror permit a wide range of adjustment of the height of the mirror as well as the distancing of the mirror from the user.

In another embodiment of the present invention, the neck strap supports and the mirror supports are hinged such that the neck strap supports and the mirror supports can be collapsed or folded into the box. In this embodiment, collapsing of the mirror supports permits the mirror to be used as a lid for the box.

BRIEF DESCRIPTION OF THE DRAWINGS

FIG. 1 is a perspective view of a first embodiment of the mirror assembly of the present invention;

FIG. 2 is a perspective view of the mirror assembly shown in FIG. 1 as worn by a user;

FIG. 3 is a front view of a pivotal connection taken along Line 3—3 of FIG. 1;

FIG. 4 is a perspective view of a second embodiment of the mirror assembly of the present invention;

FIG. 5 is a perspective view of the second embodiment of the mirror assembly in a closed position;

FIG. 6 is a cross-sectional view of the second embodiment of the mirror assembly taken along Line 6—6 of FIG. 5; and FIG. 7 is a cross-sectional view of the second embodiment of the mirror assembly taken along Line 7—7 of FIG. 5.

DESCRIPTION OF THE PREFERRED EMBODIMENTS

FIGS. 1 and 2 illustrate a first embodiment of a portable adjustable mirror assembly 10 which is constructed in accordance with the principles of the present invention. The mirror assembly 10 comprises a box 12, neck strap supports 26, 28 a neck strap 44, mirror support means 50 and mirror 58.

In the embodiment shown in FIGS. 1 and 2, the box 12 of the mirror assembly 10 comprises a base 14, a front wall 16, a rear wall 18 and two side walls 20,22. The rear wall 18 is substantially U-shaped and comprises a base portion 24 and two upstanding leg portions 26,28. The two upstanding leg portions 26,28 form two neck strap supports. A neck strap 44 is removably fastened to the neck strap supports 26,28. A preferred means for removably fastening the neck strap 44 to the neck strap supports 26,28 comprises VELCRO fastening means. VELCRO fastening means is a nylon material made with both a surface of small hooks and a complementary surface of an adhesive pile, which surfaces can be pressed together or pulled apart for easy fastening and unfastening. In the embodiment of the present invention shown in FIG. 1, each of the neck strap supports 26,28 have an adhesive pile 34,36 provided on a surface adjacent the upper ends 30,32 of the upstanding leg portions 26,28. The ends of the neck strap 44 have a plurality of nylon hooks 46,48 provided on the sufaces thereof. The base portion 24 of the rear wall 18 carries mirror support mounting means 38. In the embodiment of FIG. 1, the mirror support mounting means 38 comprises two juxtaposed mounting studs 40,42 adapted to receive a portion of mirror support means 50 therebetween.

The mirror support means 50, shown in FIG. 1, comprises a first arm 52 pivotally secured to two second arms 54,56. The first arm 52 of the mirror support 50 is movably secured to the mirror support mounting means 38 near one end of the first arm 52. In the embodiment shown in FIG. 1, the first arm 52 is movably secured between the mounting studs 40,42 carried by the rear wall 18 by connecting means 62. The other end of the first arm 52 is movably secured between first ends of the second arms 54,56. This other end of the first arm 52 is received between the first ends of the second arms 54,56 and is movably secured therebetween by connecting means 64. The mirror 58, having an elongated handle 60, is also movably secured between the second arms 54,56 of the mirror support means 50. One end of the elongated handle 60 is adjacent the reflective portion 80 of mirror 58 and the other end of the elongated handle 60 is movably secured between the second ends of the second arms 54,56 by connecting means 66.

One suitable pivotal connecting means, useful as connecting means 62,64 and/or 66 is shown in FIG. 3. FIG. 3 is a front view taken along Line 3—3 of FIG. 1 and illustrates one embodiment of a pivotal connecting means suitable for connecting the elongated handle 60 between the second arms 54,56 of the mirror support 50. As shown in FIG. 3, the pivotal connecting means 66 comprises a screw 68, and a wing nut 70. The pivotal connecting means 66 further comprises a plurality of washers 72,74,76 and 78.

When the mirror assembly 10 is worn by a user as shown in FIG. 2, the neck strap 44 is placed around the neck of the user and the rear wall 18 of the box 12 is positioned adjacent the torso of the user. The pivotal connecting means 62,64 and 66 permit the user to adjust the height of the mirror 58 as well as the distance of the mirror 58 from the user. The pivotal connecting means 62 permit the user to vary the angle between the rear wall 18 of the box 12 and the first arm 52 of mirror support means 50. The pivotal connecting means 64 permit the user to vary the relative angle between the first arm 52 and the second arms 54,56 of the mirror support 50. The pivotal connecting means 66 permits the user to vary the relative angle between the second arms 54,56 of the mirror support means 50 and the elongated handle 60 of the mirror 58. Thus, adjustment of the pivotal connecting means 62,64 and 66 permit the user to position the mirror 58 in a wide variety of positions. Although one suitable pivotal connecting means 66 is illustrated in FIG. 3, it is to be understood that the pivotal connecting means 62,64 and 66 may be any means capable of movably securing the various structural elements to one another. Other means capable of serving as the pivotal connecting means 62,64 and 66 include hinges, ball and socket connectors and any other connecting means which permit adjustment of the relative angles between the first arm 52 and the rear wall 18, between the first arm 52 and the second arms 54,56 and between the elongated handle 60 of the mirror 58 and the second arms 54,56.

A second embodiment of a portable adjustable mirror assembly of the present invention is shown in FIGS. 4-7. Referring now to FIG. 4, this second embodiment of the present invention is a mirror assembly 110 comprising a box 112, neck strap supports 124,126, a neck stap 138, mirror support means 144,146 and a mirror 164. The box 112 has a base 114, a front wall 116, a rear wall 118, and two side walls 120,122. The walls 116,118,120,122 are upright and are positioned along the peripheral edges of the base 114. The lower edges of the walls 116,118,120 and 122 are adjacent the base 114 and the upper edges of these walls 116,118,120,122 define an open top of the box 112. The walls 116,118,120 and 122 are preferably of equal height.

Two neck strap supports 124,126 are carried by the rear wall 118 in spaced apart relation. First ends of the neck strap supports 124,126 are movably secured to the rear wall 118, preferably along the inner surface of the rear wall 118, by pivotal connecting means 134,136. Pivotal connecting means 134, 136 permit the neck strap supports 124,126 to be rotated downwardly toward the base 114 of the box 112 such that the neck strap supports 124,126 do not extend above the upper edge of the rear wall 118. When positioned in an upright position, the neck strap supports 124,126 extend above the upper edge of the rear wall 118 and are substantially perpendicular to the base 114 of the box 112. The unsecured, second ends of the neck strap supports 124,126 have an adhesive pile 130,132 or other fastening means provided on at least one surface thereof.

The neck strap 138 has two ends adapted to be removably fastened to the neck strap supports 124,126. Each of the ends of the neck strap 138 has a plurality of nylon hooks 140,142 or other fastening means provided on the surface thereof. The plurality of nylon hooks 140,142 and the adhesive pile 130,132 provided on the neck strap supports 124,126 are preferably VELCRO fastening means. Thus, the nylon hooks 140,142 on the neck strap 138 and the adhesive pile 130,132 on the neck strap supports 124,126 provide means for removably fastening the neck strap 138 to the neck strap supports 124,126. The neck strap 138 is removably fastened to the neck strap supports 124,126 by engaging the nylon hooks 140 on one end of the neck strap 138 with the adhesive pile 130 on one of the neck strap supports 124 and by engaging the nylon hooks 142 on the other end of the neck strap 138 with the adhesive pile 132 on the other neck strap support 126.

The mirror assembly 110 further comprises a pair of spaced apart mirror supports 144,146 carried by the front wall 116 of the box 112. Each of the mirror supports 144,146 comprises a first arm 148,150 and a second arm 152,154. The first arms 148,150 of the mirror supports 144,146 have first ends movably secured or hinged to the front wall 116 of the box 112 through connecting means 156,158. Second ends of the first arms 148,150 are movably secured to first ends of the second arms 152,154 through connecting means 160,162. Second ends of the second arms 152,154 of the mirror supports 144,146 are movably secured to the mirror 164 through connecting means 166,168. Connecting means 156,158 permit adjustment of the angle between the first arms 148,150 of the mirror supports 144,146 and the front wall 116 of the box 112. Connecting means 160,162 permit relative adjustment of the angle between the first arms 148,150 and the second arms 152,154 of the mirror supports 144,146. Connecting means 166,168 permit relative adjustment of the angle between the second arms 152,154 of the mirror supports 144,146 and the mirror 164. The connecting means 156,158,160,162,166 and 168 may comprise any means capable of permitting relative movement between the structural components connected therethrough. Suitable connecting means include wing nuts and screws, hinges, and ball and socket connectors, for example.

In the mirror assembly 110 of the present invention, the mirror 164 functions as a lid for the box 112. The connecting means 156,158,160,162,166 and 168 permit the mirror supports 144, 146 to be folded or collapsed such that the mirror 164 comes into contact with the upper edges of the walls 116,118,120 and 122 of the box 112. FIG. 6 illustrates the mirror assembly 110 in its closed position, with the mirror 164 positioned adjacent to the upper edges of the walls 116,118,120 and 122. FIG. 6 is a cross-sectional view taken along Line 6—6 of FIG. 5 and illustrates the relative positions of the first arm 148 and second arm 152 of the mirror support 144 in a collapsed or folded position. As shown in FIG. 6, when the mirror 164 is in contact with the walls 116,118,120 and 122, the mirror support 144 is completely contained within the box 112 with the first arm 148 substantially parallel to the base 114 of the box 112 and the angle between the first arm 148 and the second arm 152 of the mirror support 144 is an angle less than 90°. FIG. 7 is a cross-sectional view taken along Line 7—7 of FIG. 5. FIG. 7 shows the neck strap supports 124,126 in a collapsed position such that the unsecured second ends of the neck strap supports 124,126 are located below the upper edge of the rear wall 118. Thus, when the mirror assembly 110 of the present invention is in its closed position, the mirror supports 144,146 and the neck strap supports 124,126 are completely contained within the interior of the box 112. In its closed position, the mirror 164 serves as a lid for the box 112 and, therefore, it is preferable that the mirror 164 be of substantially equal dimensions as the base 114 of the box 112.

As will be readily apparent, when the mirror assembly 110 is in use, the neck strap 138 is positioned around the neck of a wearer in a manner similar to that shown in FIG. 2. When positioned on a wearer, the rear wall 118 of the box 112 of the mirror assembly 110 is in contact with the torso of the wearer. The mirror 164 is lifted from its closed position and the mirror supports 144,146 are fully extended. The connecting means 156,158,160,162,166 and 168 permit relative adjustment of the height of the mirror and the distance of the mirror from the wearer. Connecting means 156,158 permit adjustment of the position of the first arms 148,150 of the mirror supports 144,146 with respect to the front wall 116 of the box 112. Connecting means 160,162 permit adjustment of the angle formed between the first arms 148,150 and second arms 152,154 of the mirror supports 144,146. Connecting means 166,168 permit adjustment of the position of the mirror 164 with respect to the second arms 152,154 of the mirror supports 144,146.

The boxes 12,112 of the mirror assemblies 10,110 may be constructed of any suitable material such as plastic, wood or pliable metal. In addition, the interior of the boxes 12,112 may be provided with additional walls defining compartments or the base 14,114 of the boxes 12,112 may be provided with integral trays for containing or organizing grooming implements. The neck straps 44,138 of the mirror assemblies 10,110 may be made of any suitable material and, preferably, are flexible. Most conveniently, the neck straps 44,138 are made of a washable material thereby permitting the neck straps 44,138 to be cleaned upon removal from the neck strap supports 26,28 or 124,126. The mirror supports 50,144,146 may be contructed of any suitable material such as pliable metal, plastic or wood. The mirror 58,164 is preferably contructed of an unbreakable material such as plexiglass.

Although the present invention has been described in detail with reference to specific embodiments thereof, it will be understood that variations can be made without departing from the scope of the invention as described above and as claimed below.

What is claimed is:

1. A portable adjustable mirror assembly comprising:
A. a box comprising a base and an upright rear wall, said rear wall being provided with two neck strap supports, said neck strap supports comprising two upstanding leg portions of said rear wall, each of said upstanding leg portions having an upper end distal from the base and having first fastening means provided on a surface adjacent said upper end;
B. a neck strap having two ends, each of said ends of the neck strap having second fastening means provided on a surface thereof, said second fastening means being adapted to removably engage the first fastening means of the neck strap supports;
C. a mirror support having a first end and a second end, a portion of said mirror support adjacent the first end being movably secured to the box; and
D. a mirror movably secured to the second end of the mirror support;
said mirror support comprising a first a first arm having first and second ends, the first end of the first arm being the first end of the mirror support, the second end of the first arm being movably secured to the first end of the second arm, and the second end of the second arm being the second end of the mirror support.

2. The mirror assembly of claim 1 wherein the first fastening means and the second fastening means comprise VELCRO fastening means.

3. The mirror assembly of claim 1 wherein the first fastening means comprises an adhesive pile and the second fastening means comprises a plurality of nylon hooks.

4. The mirror aserńbly of claim 1 wherein the first fastening means comprises a plurality of nylon hooks and the second fastening means comprises an adhesive pile.

5. The mirror assembly of claim 1 wherein the neck strap is removably fastened to the neck strap supports by engaging the second fastening means on one end of the neck strap with the first fastening means on one of the neck strap supports and by engaging the second fastening means on the other end of the neck strap with the first fastening means on the other neck strap support.

6. The mirror assembly of claim 1 wherein the rear wall of the box is provided with mirror support mounting means and the mirror support is movably secured to the box by said mirror support mounting means.

7. The mirror assembly of claim 1 wherein the mirror has an elongated handle, said mirror being movably secured to the second end of the mirror support at one end of said elongated handle.

8. A portable adjustable mirror assembly comprising:
A. a box comprising a base and four upright walls positioned along peripheral edges of the base, said walls comprising a front wall, a rear wall opposite said front wall, and two side walls extending from the front wall to the rear wall, said rear wall being substantially U-shaped and comprising a base portion and two upstanding leg portions, said two upstanding leg portions forming two neck strap supports, each of said neck strap supports having an upper end distal from the base of the box and having an adhesive pile provided on a surface adjacent the upper end thereof, said base portion of the rear wall being provided with a mirror support mounting means, said mirror support mounting means comprising a pair of juxtaposed mounting studs;
B. a neck strap having two ends, each of said ends of the neck strap having a plurality of nylon hooks provided on a surface thereof, said plurality of nylon hooks being adapted to removably engage the adhesive pile on the neck strap supports whereby the neck strap is removably fastened to the neck strap supports by engaging the nylon hooks on one end of the neck strap with the adhesive pile on one of the neck strap supports and by engaging the nylon hooks on the other end of the neck strap with the adhesive pile on the other neck strap support;
C. a mirror support carried by the rear wall of the box, said mirror support comprising a first arm and a pair of second arms, said first arm having a first end and a second end, a portion of the first arm adjacent the first end of the first arm being movably secured between the mounting studs of the mirror support means of the rear wall, and the second end of the first arm being movably secured between first ends of the second arms; and D. a mirror having a reflective portion and an elongated handle, one end of said elongated handle being adjacent the reflective portion of the mirror and the other end of the elongated handle being movably secured between second ends of the second arms of the mirror support.

9. A portable adjustable mirror assembly comprising:

A. a box comprising a base, an open top oppoiste the base, and four upright walls positioned along peripheral edges of the base, said walls having lower edges adjacent the base and upper edges defining the open top of the box, said four walls comprising a front wall, a rear wall opposite said front wall and two side walls extending from the front wall to the rear wall;

B. a pair of neck strap supports carried by the rear wall in spaced apart relation, each of said neck strap supports having a first end secured to the rear wall and an unsecured second end, said second end of each neck strap having first fastening means provided on at least one surface thereof;

C. a neck strap having two ends, each of said ends of the neck strap having second fastening means provided on a surface thereof, said second fastening means being adapted to removably engage the first fastening means on the neck strap supports;

D. mirror support means carried by the front wall of the box, said mirror support means having a first end movably secured to the front wall of the box; and E. a mirror carried by the mirror support means, said mirror being movably secured to a second end of the mirror support means;

said mirror assembly comprising a pair of spaced apart mirror supports carried by the front wall, each of said mirror supports comprising a first arm and a second arm, said first arm having a first end movably secured to the front wall of the box and a second end movably secured to a first end of the second arm, and a second end of the second arm being movably secured to the mirror.

10. The mirror assembly of claim 9 wherein the first fastening means and the second fastening means comprise VELCRO fastening means.

11. The mirror assembly of claim 9 wherein the first fastening means comprise an adhesive pile and the second fastening means comprise a pluality of nylon hooks adapted to removably engage the adhesive pile.

12. The mirror assembly of claim 9 wherein the neck strap supports are pivotally secured to the rear wall such that the unsecured second ends of the neck strap supports are movable from a position above the upper edge of the rear wall to a position below the upper edge of the rear wall.

13. The mirror assembly of claim 9 wherein the mirror support means provides means for positioning the mirror in contact with the upper edges of the walls of the box.

14. The mirror assembly of claim 13 wherein the mirror and the base of the box are of substantially equal dimensions.

15. A portable adjustable mirror assembly comprising:

A. a box having a base, an open top opposite the base, and four upright walls positioned along peripheral edges of the base, said walls having lower edges adjacent the base and upper edges defining the open top of the box, said four walls comprising a front wall, a rear wall opposite the front wall and two side walls extending from the front wall to rear wall, wherein the distance from the lower edge to the upper edge of each of said four walls is substantially equal;

B. a pair of spaced apart neck strap supports carried by the rear wall, each of said neck strap supports having a first end movably secured to the rear wall and an unsecured second end, said second end of each neck strap having an adhesive pile provided on at least one surface thereof;

C. a neck strap having two ends, each of said ends of the neck strap having a plurality of nylon hooks provided on a surface thereof, said plurality of nylon hooks being adapted to removably engage the adhesive pile on the neck strap supports whereby the neck strap is removably fastened to the neck strap supports by engaging the nylon hooks on one end of the neck strap with the adhesive pile on one of the neck strap supports and by engaging the nylon hooks on the other end of the neck strap with the adhesive pile on the other neck strap supports;

D. a pair of spaced apart mirror supports carried by the front wall of the box, each of said mirror supports comprising a first arm and a second arm, said first arm having a first end movably secured to the front wall of the box and a second end movably secured to a first end of the second arm; and E. a mirror carried by the mirror supports, said mirror being movably secured to a second end of each of the mirror supports.

16. A portable adjustable mirror assembly comprising:

A. a box comprising a base and an upright rear wall, said rear wall being provided with two neck strap supports, said neck strap supports comprising two upstanding leg portions of said rear wall, each of said upstanding leg portions having an upper end distal from the base and having first fastening means provided on a surface adjacent said upper end;

B. a neck strap having two ends, each of said ends of the neck strap having second fastening means provided on a surface thereof, said second fastening means being adapted to removably engage the first fastening means of the neck strap supports;

C. a mirror support having a first end and a second end, a portion of said mirror support adjacent the first end being movably secured to the box; and D. a mirror movably secured to the second end of the mirror support;

said mirror support comprising a first arm having first and second ends and a pair of second arms, each of said second arms having first and second ends, the first end of the first arm being the first end of the mirror support, the second end of the first arm being movably secured between the first ends of the second arms, and the second ends of the second arms being the second end of the mirror support.

* * * * *